US010508711B2

(12) United States Patent
Di Meco et al.

(10) Patent No.: US 10,508,711 B2
(45) Date of Patent: Dec. 17, 2019

(54) TRANSMISSION BELT AND ASSOCIATED TRANSMISSION SYSTEM

(71) Applicant: DAYCO EUROPE S.R.L., Chieti (IT)

(72) Inventors: Marco Di Meco, Chieti (IT); Fabrizio Breggia, Chieti (IT); Gianluca Perfetti, Chieti (IT); Giacomo Casagrande, Chieti (IT)

(73) Assignee: Dayco Europe S.R.L, Chieti (IT)

( * ) Notice: Subject to any disclaimer, the term of this patent is extended or adjusted under 35 U.S.C. 154(b) by 123 days.

(21) Appl. No.: 15/302,177

(22) PCT Filed: Apr. 8, 2014

(86) PCT No.: PCT/IB2014/060535
§ 371 (c)(1),
(2) Date: Oct. 6, 2016

(87) PCT Pub. No.: WO2015/155567
PCT Pub. Date: Oct. 15, 2015

(65) Prior Publication Data
US 2017/0023100 A1 Jan. 26, 2017

(51) Int. Cl.
*F16G 1/28* (2006.01)
*F16H 7/02* (2006.01)

(52) U.S. Cl.
CPC ............... *F16G 1/28* (2013.01); *F16H 7/023* (2013.01)

(58) Field of Classification Search
CPC .................................. F16G 1/28; F16H 7/023
(Continued)

(56) References Cited

U.S. PATENT DOCUMENTS 3,968,703 A * 7/1976 Bellmann ............... B29D 29/10
474/250
4,741,726 A * 5/1988 Zarife ....................... F16G 5/20
474/268
(Continued)

FOREIGN PATENT DOCUMENTS

EP          0 844 413 A2    5/1998
GB          2 351 336 A    12/2000
(Continued)

OTHER PUBLICATIONS

PCT, International Search Report and Written Opinion, International Application No. PCT/162014/060535, 11 pages (dated Dec. 5, 2014).
(Continued)

*Primary Examiner* — Michael R Mansen
*Assistant Examiner* — Mark K Buse
(74) *Attorney, Agent, or Firm* — FisherBroyles, LLP; Susan M. Oiler

(57) ABSTRACT

A transmission belt is described which comprises a body made of a first elastomeric material, a plurality of teeth and a plurality of longitudinal cords buried in the body of the belt and a back. The belt has a working surface on said teeth and the working surface is at least partially covered by a covering made of a plastic and/or metal material. Defining the area comprised between the plane defined by the neutral axis of the cords, the working surface and the median transverse planes of two adjacent teeth as the unitary longitudinal section, the covering preferably occupies at least 25% of the unitary longitudinal section.

20 Claims, 4 Drawing Sheets

(58) Field of Classification Search
USPC .......................................................... 474/205
See application file for complete search history.

(56) References Cited

U.S. PATENT DOCUMENTS

| | | | | |
|---|---|---|---|---|
| 6,485,386 | B2* | 11/2002 | Yuan | B29D 29/08 474/268 |
| 8,192,316 | B2* | 6/2012 | Marc | B65G 15/34 442/229 |
| 2002/0119854 | A1* | 8/2002 | Mohr | F16G 1/28 474/237 |
| 2004/0116225 | A1* | 6/2004 | Ackerman | F16G 1/28 474/205 |
| 2006/0287148 | A1* | 12/2006 | Wood | C08L 23/16 474/260 |
| 2007/0265123 | A1* | 11/2007 | Ichiba | F16G 1/00 474/161 |
| 2008/0004145 | A1* | 1/2008 | Duke | B29D 29/08 474/205 |
| 2008/0166576 | A1* | 7/2008 | Akiyama | B29D 29/08 428/500 |
| 2010/0197435 | A1* | 8/2010 | Gewald | F16G 1/28 474/263 |
| 2012/0071286 | A1* | 3/2012 | Pasch | B29D 29/08 474/205 |
| 2012/0192822 | A1* | 8/2012 | Rolando | F16G 1/28 123/90.31 |
| 2012/0252619 | A1* | 10/2012 | Uchigashima | F16G 1/10 474/205 |
| 2014/0287862 | A1* | 9/2014 | Yamada | F16G 1/10 474/204 |
| 2014/0296010 | A1* | 10/2014 | Yoshida | B29D 29/103 474/190 |
| 2014/0323257 | A1* | 10/2014 | Gibson | F16G 5/08 474/261 |
| 2015/0276017 | A1* | 10/2015 | Okamoto | F16G 5/20 474/238 |
| 2015/0285334 | A1* | 10/2015 | Thomas | F16G 1/10 474/90 |
| 2016/0208889 | A1* | 7/2016 | Yoshida | C08K 5/098 |
| 2017/0023098 | A1* | 1/2017 | Burlett | B29D 29/08 |
| 2017/0082174 | A1* | 3/2017 | Parziale | F16G 1/10 |
| 2017/0191545 | A1* | 7/2017 | Sekiguchi | C08L 75/04 |

FOREIGN PATENT DOCUMENTS

| | | |
|---|---|---|
| JP | S57-23451 U | 6/1982 |
| JP | S59-65644 A | 4/1984 |
| JP | S61-181144 U | 11/1986 |
| JP | S62-28939 U | 2/1987 |
| JP | H10-299836 A | 11/1998 |
| JP | 2000-283245 A | 10/2000 |
| WO | 2005/080820 A1 | 9/2005 |
| WO | 2006/035463 A1 | 4/2006 |
| WO | 2007/082920 A1 | 7/2007 |
| WO | 2007/117681 A2 | 10/2007 |

OTHER PUBLICATIONS

JP, Office Action; Japanese Application No. 2016-561827 (dated Jan. 3, 2019).

* cited by examiner

TRANSMISSION BELT AND ASSOCIATED TRANSMISSION SYSTEM

CROSS-REFERENCE TO RELATED APPLICATIONS

This application is a National Stage filing of International Application No. PCT/IB2014/060535, filed Apr. 8, 2014, which is incorporated herein by reference in its entirety.

TECHNICAL FIELD

The present invention relates to a transmission belt and to the associated transmission system, in particular a toothed transmission belt.

PRIOR ART

Transmission belts, especially toothed ones, generally comprise a body made of an elastomeric material, in which a plurality of longitudinal thread-like durable inserts, also known as cords, is buried and a plurality of teeth covered by a covering fabric.

Each component of the belt contributes to increasing performance in terms of mechanical resistance, in order to decrease the risk of the belt breaking and to increase the specific transmissible power.

In particular, the cords contribute to ensuring the required mechanical characteristics of the belt and make, an essential contribution to determining the modulus of the belt and, in particular, ensure stable performance over time. The cords are generally obtained by winding high-modulus fibres several times.

The cords are normally treated with suitable compounds to increase the compatibility of the fibres with the body compound that surrounds the cords.

The body compound enables connecting the various above-mentioned elements and ensures that they contribute to the final performance of the belt in a synergetic manner.

Body compounds are based on one or more elastomeric materials, preferably enriched with fibres to increase hardness.

Lastly, the covering fabric of the belts has the task of increasing abrasion resistance and thus protects the working surface of the belt from wear due to rubbing between the sides and the slopes of the teeth of the belt and the sides and the throats of the grooves and the pulley with which the belt interacts.

In addition, the covering fabric reduces the coefficient of friction of the working surface, reduces the deformability of the teeth and, most of all, reinforces the root of the tooth, thereby avoiding its breakage.

However, in recent engines where performance has increased significantly, toothed belts, which are normally used "dry", are subjected to high temperatures and these temperatures result in quicker deterioration of the materials forming the various components of the belts and the toothed belts must have better mechanical characteristics in order to have a longer mean lifetime.

By "dry" use, it is intended that the belts are external to the engine block, are only accidentally in contact with engine oil and are generally not in contact with oil mixed with fuel or other oil pollutants.

Furthermore, engines have been recently developed for motor vehicles comprising a timing transmission system in which the chains have been replaced by toothed belts in the same working environment.

Systems of this type have been illustrated in patents by the applicant, as in WO2005080820 for example.

In these transmission systems, the belt is known as an "oil-bath belt" or "wet belt" and must be able to satisfy the same longevity requirements of the equivalent chain or dry-belt transmission systems.

Within the scope of the present invention, an "oil-bath belt" or "wet belt" is understood to be a toothed belt used in transmission systems in which it is at least partially immersed in oil at rest and/or during operation, or in transmission systems in which the belt is continuously in contact with oil, for example, systems in which oil is supplied to the belt, for example as a spray via a specially-provided nozzle or by shaking due to the action of the belt and the pulleys.

In particular, in these transmission systems there are no means of separation between the oil lubricating the engine and the transmission system.

These transmission systems are different from traditional ones in which so-called dry toothed belts are employed and in which there are separation means or components that separate the toothed transmission belt from the engine oil, which lubricates the various parts of the engine and which can only accidentally come into contact with the surface of the toothed belt.

Wet belts must therefore resist continuous contact with high-temperature oil during engine operation and not sustain damage, neither at high operating temperatures, nor at low very low temperatures.

With respect to chain transmissions, belt transmissions generally have lower costs and much lower friction losses and are also less expensive. In addition, a belt transmission is quieter and the stretching of the belt is at most a quarter of that of a chain: this enables controlling the valves of the internal combustion engine much more precisely and also leads to fuel savings.

In general, the basic problem of transmission systems in which the belt substitutes a chain is to make a toothed belt that can last at least 240,000 km or 150,000 miles, or rather to ensure that, under normal operating conditions, the toothed belt never needs to be changed for the entire working life of the vehicle.

To this end, the belts must have better mechanical characteristics than those currently on the market.

Transmission systems in which the toothed belt is wet with oil and/or works continuously in oil are generally very similar to those where a chain is used for motion transmission. Frequently, the compartment in which the belt moves is obtained from a surface of the engine crankcase.

For use in oil, it is currently known, for example, to use covering fabrics for the toothing of toothed belts with a structure constituted by woven threads, or rather threads that extend, in use, in a longitudinal direction of the belt comprising fibres of polyamide or with a composite structure, each formed by an elastic thread as the core and a pair of composite threads wound round the elastic thread.

However, this solution is particularly disadvantageous as the fabric easily deteriorates and causes quite a few belt breakages, in particular in high-temperature conditions and in systems where the belt works continuously in contact with oil.

Both in the case of using toothed belts in oil and in that of using them dry, the most frequent cause of breakage is actually the breaking of teeth, particularly due to stress in the area of tooth engagement on the pulley. It would be desirable to have a toothed belt that has improved mechanical characteristics in this area.

It has also been proposed to replace the fabrics used as a covering with layers of thermoplastic material to increase wear resistance. These layers are generally thin, for example around 100 microns and perform the same functions of the fabric. These layers are generally in the form of films, but it has been experimentally determined that not only do they fail to fully solve the problem of wear, but also fail to give any significant contribution to improving the mechanical characteristics. In particular, when the belts are used in oil and so should not be replaced, the thin layers do not allow the general mechanical characteristics to be achieved that would enable lasting for the lifetime of the car.

Alternative solutions are therefore being sought for both dry belts and wet belts that allow improving the mechanical characteristics with respect to known belts.

SUMMARY OF THE INVENTION

A first object of the present invention is to obtain a transmission belt, in particular a toothed belt with superior mechanical characteristics, which is resistant to high temperatures when dry and also, in particular, when continually used in contact with oil or even partially immersed in oil, and which, at the same time, is easily manufactured and inexpensive.

A further object of the present invention is to obtain a transmission belt, in particular a toothed belt, which has a long service life and which therefore has excellent mechanical characteristics regarding adhesion and meshing precision.

A further object of the present invention is to obtain a transmission system that comprises a toothed belt and means for keeping the toothed belt continuously in contact with oil or even partially immersed in oil during operation and where the toothed belt has high wear resistance at high temperatures.

In accordance with the present invention, these objects are achieved by a transmission belt according to claim 1.

In accordance with the present invention, a transmission system according to claim 20 is also provided.

BRIEF DESCRIPTION OF DRAWINGS

For a better understanding of the present invention, it will now be described with reference to the attached figures, in which.

DESCRIPTION

Figure 1:
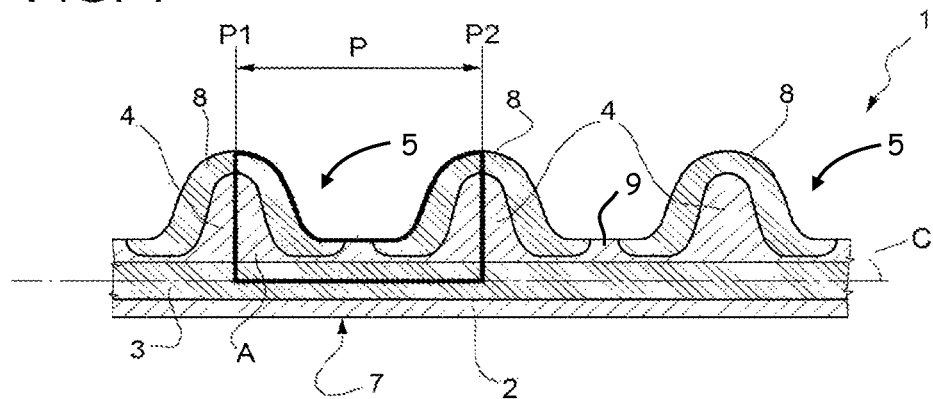
FIG. 1 is a side view of a portion of toothed belt according to the present invention.
Figure 2:
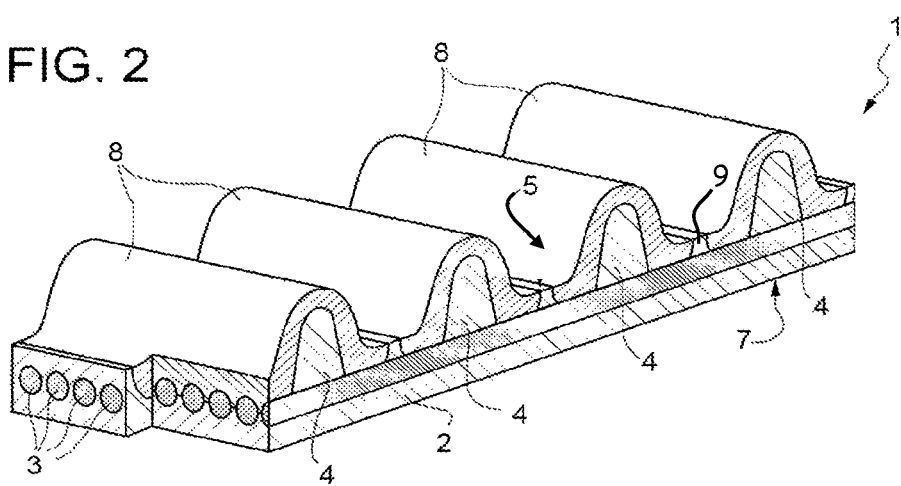
FIG. 2 is a partial perspective view of a portion of a first embodiment of a toothed belt according to the present invention.
Figure 3:
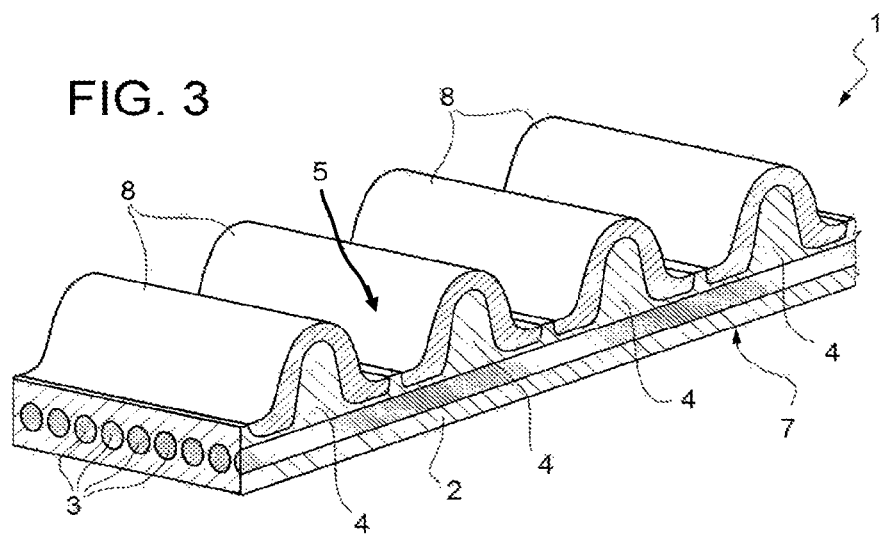
FIG. 3 is a partial perspective view of a portion of a second embodiment of a toothed belt according to the present invention.

FIGS. 1 to 3 show a toothed belt, indicated as a whole by reference numeral 1. The belt 1 comprises a body 2 comprising a first elastomeric material, in which a plurality of longitudinal thread-like durable inserts 3 is buried and toothing 4 composed of a plurality of teeth that, in use, constitute the working surface 5, or rather the surface that meshes with a corresponding pulley of the transmission system.

The toothed belt also comprises a back 7 opposite to the working surface 5.

Preferably, the body 2 is made of a compound comprising one or more elastomeric materials and numerous additives. For convenience, the elastomeric material(s) is/are hereinafter indicated altogether as a "first elastomeric material".

The body of the belt advantageously comprises an elastomer as the main elastomer in the first elastomeric material that is chosen from the group constituted by natural rubber (NR), polychloroprene (CR), acrylonitrile butadiene (NBR) and associated hydrogenated elastomers known as hydrogenated acrylonitrile butadiene (HNBR) or zinc salts of hydrogenated acrylonitrile butadiene seamed with esters of unsaturated carboxylic acid, polyisoprene, styrene-butadiene rubbers, ethylene-alpha-olefin elastomers, EPDM, polyurethane, fluoroelastomers, ethylene-acrylic elastomers (AEM), bromobutyls, chlorosulphonated polythene (CSM) or chlorosulphonated alkyl, chlorinated polythene, epoxidized natural rubber, SBR, NBR carboxylates, HNBR carboxylates, ACM and mixtures of these compounds.

The "main elastomer" is intended as being present in the compound that constitutes the body for more than 50% by weight, calculated on the total weight of all the elastomers in the compound and therefore excluding all other non-elastomeric components of the belt.

The body preferably comprises at least one copolymer of polyolefin or a rubber containing acrylonitrile units as the first or a further elastomeric material.

More advantageously, the copolymer(s) used as body compounds are nitrile rubbers, advantageously acrylonitrile butadiene rubbers, known as NBR. Even more advantageously, they are hydrogenated acrylonitrile butadiene, or HNBR, or even XHNBR, i.e. hydrogenated and carboxylated acrylonitrile butadiene.

Advantageously, the HNBR used for making the transmission systems in which the belt is partially in an oil bath or in direct contact with oil and impurities has a high level of hydrogenation, for example so-called completely saturated HNBRs can be used, these having a percentage of residual double bonds of 0.9% at most, but HNBRs with a lower level of unsaturation can also be used in alternative, such as, for example, so-called partially saturated HNBRs having a saturation level of 4% or 5.5%.

Some examples of HNBR copolymers that can be used in the body compound, but also in the different treatments of the various elements forming the toothed belt, include copolymers belonging to the THERBAN family made by Lanxess, such as THERBAN 3407 with 34% nitrile groups and a hydrogenation level of 0.9% at most, THERBAN 3406 with 34% nitrile groups and an unsaturation level of 0.9% at most, THERBAN 3607 with 36% nitrile groups and an unsaturation level of 0.9% at most, THERBAN 3446 with 34% nitrile groups and an unsaturation level of 4% at most, THERBAN 3447 with 34% nitrile groups and an unsaturation level of 5.5% at most, THERBAN 3627 with 36% nitrile groups and an unsaturation level of 2% at most, THERBAN 3629 with 36% nitrile groups and an unsaturation level of 2% at most, and THERBAN 3907 with 39% nitrile groups and an unsaturation level of 0.9% at most.

Alternatively, it is also possible to use HNBRs made by Nippon Zeon with the name ZETPOL. In particular, ZETPOL 2000 with 36% nitrile groups and an unsaturation level of 0.9% at most, ZETPOL 2000L with 36% nitrile groups and an unsaturation level of 0.9% at most, ZETPOL 2010 with 36% nitrile groups and an unsaturation level of 4% at most, ZETPOL 2010L with 36% nitrile groups and an unsaturation level of 4% at most, ZETPOL 2010H with 36% nitrile groups and an unsaturation level of 4% at most, ZETPOL 2020 with 36% nitrile groups and an unsaturation level of 5.5% at most, and ZETPOL 2020L with 36% nitrile groups and an unsaturation level of 5.5% at most.

More advantageously, the acrylonitrile units in the elastomer for applications in oil are between 33% and 51%, for example 50% by weight, while for dry applications they are between 15% and 25% by weight, for example 21% by weight.

Even more advantageously, a polymer formed by a mixture of one or more copolymers, obtained starting from a diene monomer and a monomer containing nitrile groups where an acid or salt of an unsaturated carboxylic acid is added to one or more of these copolymers, is used in combination with a first polymer. More advantageously, the unsaturated carboxylic acid is methacrylic or acrylic acid and said salt is a zinc salt of the methacrylic or acrylic acid. Even more advantageously, a zinc salt of methacrylic acid is used. Even more advantageously, the zinc salt of methacrylic acid is added in a quantity in the range between 10 and 60 phr.

For example, the elastomers sold by Zeon under the following names can be used advantageously: ZSC 1295, ZSC 2095, ZSC 2195, ZSC 2295, ZSC 2295L, ZSC 2295R and ZSC 2395.

In particular, it is possible to partially or entirely replace the previously mentioned HNBRs, namely ZETPOL and/or THERBAN with a ZSC that comprises an unsaturated carboxylic acid and zinc oxide and/or with THERBAN ART that comprises an unsaturated carboxylic acid salt.

Mixed compounds of polyolefin and rubber containing acrylonitrile units are also preferred, more preferably compounds containing a copolymer of ethylene with NBRs or HNBRs or the above-mentioned modified HNBRs. For example, rubbers containing EPDM (ethylene-propylene diene monomer) or EPM (ethylene-propylene monomer) can be added to polymers containing acrylonitrile units in quantities preferably in the range between 1% and 30%.

In addition to the elastomeric materials, the body compound can comprise conventional additives such as, for example, reinforcement agents, extenders, pigments, stearic acid, accelerators, vulcanization agents, antioxidants, activators, initiators, plasticizers, waxes, prevulcanization inhibitors, antidegradants, process oils and similar.

Advantageously, carbon black can be employed as an extender, being advantageously added in quantities in the range between and 80 phr, more advantageously about 40 phr. Advantageously, light-coloured reinforcing extenders such as talc, calcium carbonate, silica and silicates are added in quantities advantageously in the range between 0 and 80 phr, advantageously about 40 phr. It is also possible to advantageously use silanes in quantities in the range between 0 and 5 phr.

Advantageously, zinc and magnesium oxides are added in a quantity ranging between 0 and 15 phr.

Advantageously, ester plasticizers such as trimellitates or ethyl esters are added in a quantity advantageously ranging between 0 and 20 phr.

Advantageously, prevulcanization coagents such as triallyl cyanurates and organic or inorganic methacrylates such as metal salts are advantageously added in a quantity ranging between 0 and 20 phr, or organic peroxides, such as isopropyl benzene peroxide for example, in a quantity advantageously ranging between 0 and 15 phr.

Advantageously, it is possible to use durable inserts, 3 also known as cords, made of a material chosen from a group composed of glass fibres, aramid fibres, carbon fibres and PBO fibres; furthermore, it is also possible to use cords of the so-called "hybrid" type, i.e. those comprising filaments of different materials, advantageously chosen from those previously mentioned.

Preferably, the fibres forming the cord are treated with HNBR latex vulcanized with water-soluble peroxides by means of the procedure illustrated in patent WO2004057099 in the name of Nippon Glass.

In one aspect of the present invention and as shown in FIGS. 1 to 3, at least a portion of the working surface of the belt is defined by and preferably at least a part of the teeth or toothing of the belt are covered by a covering 8 comprising a non-elastomeric material.

Preferably, the non-elastomeric material is chosen from the group composed of plastic materials, thermoplastic materials, thermosetting materials and metal materials.

Preferably, the covering 8 is made of a homogeneous material.

Within the scope of the present invention, a homogeneous material is intended as one that does not exhibit discontinuities, which instead are typical of materials such as fabrics, non-woven fabrics and materials mainly based on fibres, whether yarn or non-yarn, just as all the materials that are typically used for covering the toothing of toothed belts.

A homogeneous material is not necessarily constituted by a single material, but can be formed by two or more materials or, for example, be formed by a material comprising fibre, such as a thermoplastic filled with fibres.

Clearly, the material will be homogeneous when a sample similar in size to the quantity of material used for covering a tooth is considered.

In particular, a homogeneous material will have a similar density in all areas and therefore the same mechanical properties when a sample of a similar quantity of material used for covering a tooth is considered.

The covering 8 of the toothing also differs from the thermoplastic films or solutions in which thermoplastic films are combined with fabrics or non-woven fabrics that are also used as covering for the working surface of toothed belts because the covering forms part of the teeth and, in particular, forms part of the roots of the teeth and thus forms part of the belt itself, modifying the overall rigidity of the tooth and the other mechanical characteristics of the belt, while films are generally thin and, with a thickness of about 100 micron, only protect the working surface of the belt, but are still subject to rapid wear and, above all, do not permit providing a substantial improvement in mechanical characteristics.

Within the scope of the present invention, the pitch of a belt is intended as the distance measured on a flat length of belt between two corresponding points of two adjacent teeth, the measurement being taken at rest and not under traction and is therefore different from the nominal pitch calculated on the pitch circle.

As also shown in the side view of the toothed belt 1 in FIG. 1, the section of belt is occupied by just the body compound 2 and the cords 3 in the lower portion and by the body compound as well the covering 8 in the upper portion and in the teeth area in particular. Unlike known belts in which a thin film of thermoplastic material is used, the outer covering 8 forms part of the teeth in the embodiment shown in FIGS. 1 to 3.

In a preferred aspect of the present invention, it has been found that if the outer covering 8 occupies a substantial surface of the unitary longitudinal section, it enables solving the above-described problems.

Within the scope of the present invention and with reference to FIG. 1, the area A between the surface of plane C defined by the plane that joins the neutral axis of the cords or formed by uniting the neutral axes of the cords 3, the working surface 5 and the median transvers planes P1, P2 of two adjacent teeth, is defined as the "unitary longitudinal section." The perimeter of area A in the figure is also drawn with a thicker line.

It is clear that the section on which unitary longitudinal section must be calculated is not just the outer side of the belt, but can also be any section parallel to the direction of the belt.

By a plane formed by the neutral axis of the cords 3 or formed by uniting the neutral axes of the cords 3, the plane obtained by joining the axes that pass through the centre of the cords 3 in intended.

In an alternative embodiment of the invention, a fabric or a film of thermoplastic material or the combination of a fabric with a film of thermoplastic material is placed above the body of the belt and the covering 8 can be placed above the fabric or film of thermoplastic material.

In an alternative embodiment of the invention, a fabric or a film of thermoplastic material or the combination of a fabric with a film of thermoplastic material can also be placed above the covering 8; in this way, the covering 8 will no longer be external.

In a preferred aspect of the present invention, the covering 8, made of a non-elastomeric material, occupies at least 25% of the unitary longitudinal section.

More preferably, the covering 8 occupies between 25% and 100% of the unitary longitudinal section. Even more preferably, the covering 8 occupies between 25% and 85% of the unitary longitudinal section.

The embodiment in which the covering 8 occupies between 30% and 80% of the unitary longitudinal section proves to be particularly preferred.

The embodiment in which the covering 8 occupies between 40% and 70% of the unitary longitudinal section proves to be even more particularly preferred.

Preferably, the non-elastomeric material is a homogeneous material.

A plastic material means a thermoplastic or thermosetting polymeric material, but also as a so-called thermoplastic elastomer or a thermoplastic material, or a thermosetting material mixed with one or more elastomeric materials.

Preferably, the covering 8 can be continuous and therefore entirely define the working surface of the toothed belt, or discontinuous and therefore only define certain areas of the working surface of the toothed belt.

In the embodiment in which the covering 8 is continuous, it can form a proper layer, but the layer can preferably have different thicknesses and, in particular, a greater thickness in the points where there is greater stress.

In the embodiment in which the covering is not continuous, it preferably covers at least the roots of the teeth, and more preferably covers the roots and the tips of the teeth, as in the embodiments shown in FIGS. 1 to 3.

In the embodiment in which the covering 8 is not continuous, it preferably extends from the working surface up to the cords 3 as shown in FIG. 2 or, alternatively, the cords can be entirely surrounded by the body compound 2 as in the embodiment shown in FIG. 3.

In the embodiment in which the covering 8 is not continuous, discontinuities 9 can preferably exist in the region of the roots between adjacent teeth. Consequently, the coverings preferably form separate or only partially joined caps that cover the teeth and part of the roots of the teeth.

Advantageously, the single coverings or caps above the teeth can be joined by segments of material so that the single caps are joined to each other even if the covering 8 does not entirely cover the working surface 5.

Preferably, the covering 8 is made of a non-elastomeric material.

More preferably, the outer covering 8 will comprise a thermoplastic material, a thermosetting material, or a metal material.

More preferably, the outer covering 8 is made of a homogeneous thermoplastic material, a thermosetting material, or a metal material.

Even more preferably, the covering 8 will comprise polyolefin macromolecules or macromolecules in which aromatic rings, carboxylic groups or halide ions are present in the monomers.

Even more preferably, the covering 8 is made of polyolefin macromolecules or macromolecules in which aromatic rings, carboxylic groups or halide ions are present in the monomers.

Embodiments in which the covering 8 comprises at least one material chosen from the group constituted by polyethylene, polypropylene, PMI, PMMA, polyamide, PAI, PAN, PET, PBT, PPE, PPO, PPS, PI, PEI, PAI, PEK, PEEK, PTFE, PUR and PEN are particularly preferred.

According to DIN standards 7728 and 16780 (as well as ISO 1043/1), a code is associated with each material that uniquely identifies it. See the table below:

| Abbreviation | Term |
| --- | --- |
| PAI | polyamidimide |
| PAN | polyacrylonitrile |
| PBT | poly(butylene terephthalate) |
| PEEK | polyetheretherketone |
| PEI | polyetherimide |
| PEK | polyetherketone |
| PEN | poly(ethylene naphthalate) |
| PET | poly(ethylene terephthalate) |
| PI | polyimide |
| PMI | polymethacrylimide |
| PMMA | poly(methyl methacrylate) |
| PPE | poly(phenylene ether) |
| PPO | poly(propylene oxide) |
| PPS | poly(phenylene sulfide) |
| PTFE | polytetrafluoroethylene |
| PUR | polyurethane |

Embodiments in which the covering 8 is made of at least one or more materials chosen from the group constituted by polyethylene, polypropylene, PMI, PMMA, polyamide, PAI, PAN, PET, PBT, PPE, PPO, PPS, PI, PEI, PEK, PEEK, PTFE, PUR, and PEN are particularly preferred.

It is also advantageous to strengthen the covering 8 to further improve the mechanical characteristics. Preferably, it is possible to add fibres in quantities in the range between 1% and 50% and preferably having a length in the range between 0.1 and 10 mm.

Preferably, the fibres comprise a material chosen from the group constituted by glass, carbon, PTFE and aramid fibres.

For example, the covering could comprise or be made mostly of, or rather for more than 50% by, polyamide.

It is clear that the covering could also comprise and be formed by several plastics mixed together.

Alternatively, it is also possible that the covering 8 could be formed by two or more materials forming, for example, two or more layers of homogeneous material.

For example, it is possible to use a layer of thermoplastic material, in turn covered by a layer of a metal material or a combination of the previously listed materials or it is possible to make coverings for the individual teeth, as shown in the embodiments in FIGS. 2 and 3, providing each portion of covering in a thermoplastic material covered by a metal material.

Preferably, the thickness of the outer covering 8 is in the range between 0.3 mm and 5 mm, but this clearly varies according to the size of the teeth of the toothed belt 1.

Preferably, the pitch of the toothed belts is between 5 and 10 mm.

The toothed belts of the present invention are particularly indicated for use in vehicle transmission systems.

More preferably, the toothed belts according to the present invention are also particularly suitable for being used in transmission systems in which, in use, they are in direct contact with or partially immersed in oil.

In particular, excellent results have been achieved in the case where the belt is used as a replacement for traditional gear or chain systems inside the crankcase, systems in which the belt is exposed for its entire working life to means that continuously place it in contact with oil or, if necessary, is partially immersed in an oil bath.

Figure 4:
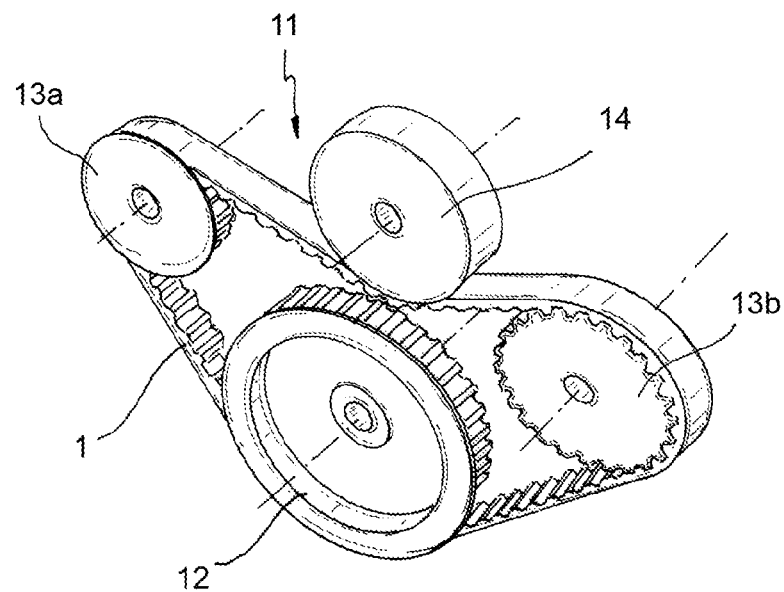
FIG. 4 is a diagram of a first timing control system using a first toothed belt according to the present invention.

The belt 1 according to the present invention is advantageously used, for example, in a timing control system for a motor vehicle of the type depicted in FIG. 4. The timing control system is indicated as a whole in the figure by reference numeral 11 and comprises a drive pulley 12 rigidly fastened to the driveshaft, not shown, a first 13a and a second 13b driven pulley and a tensioner 14 for tensioning the toothed belt.

Figure 5:
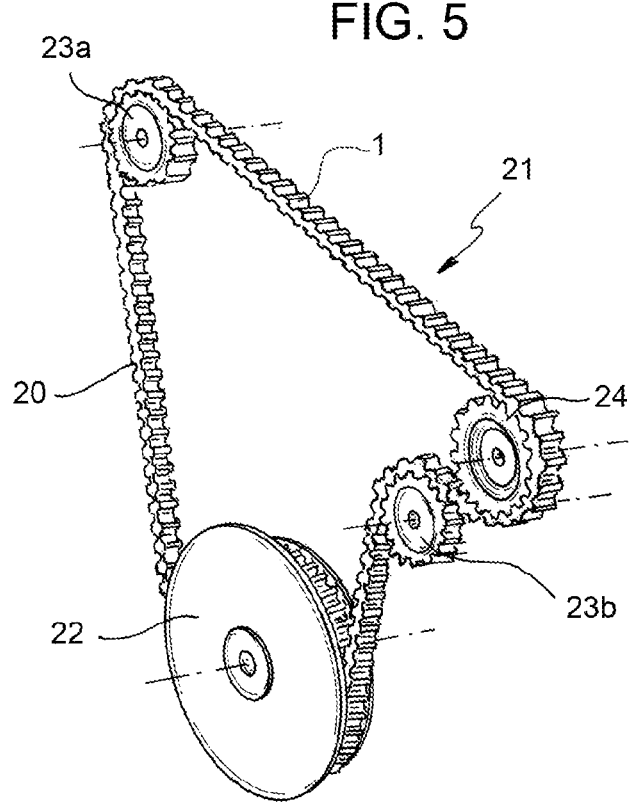
FIG. 5 is a diagram of second timing control system using a second toothed belt according to the present invention.

According to a second alternative embodiment, shown in FIG. 5, a toothed belt according to the present invention is indicated by reference numeral 1, this belt having toothing on both faces and therefore a covering 8 on one or both of the toothings.

A toothed belt 1 can also be used, for example, in a timing control system for a motor vehicle of the type depicted in FIG. 5. The timing control system is indicated as a whole in the figure by reference numeral 21 and comprises a drive pulley 22 rigidly fastened to the driveshaft, not shown, a first 23a, a second 23b and a third 24 driven pulley.

Figure 6:
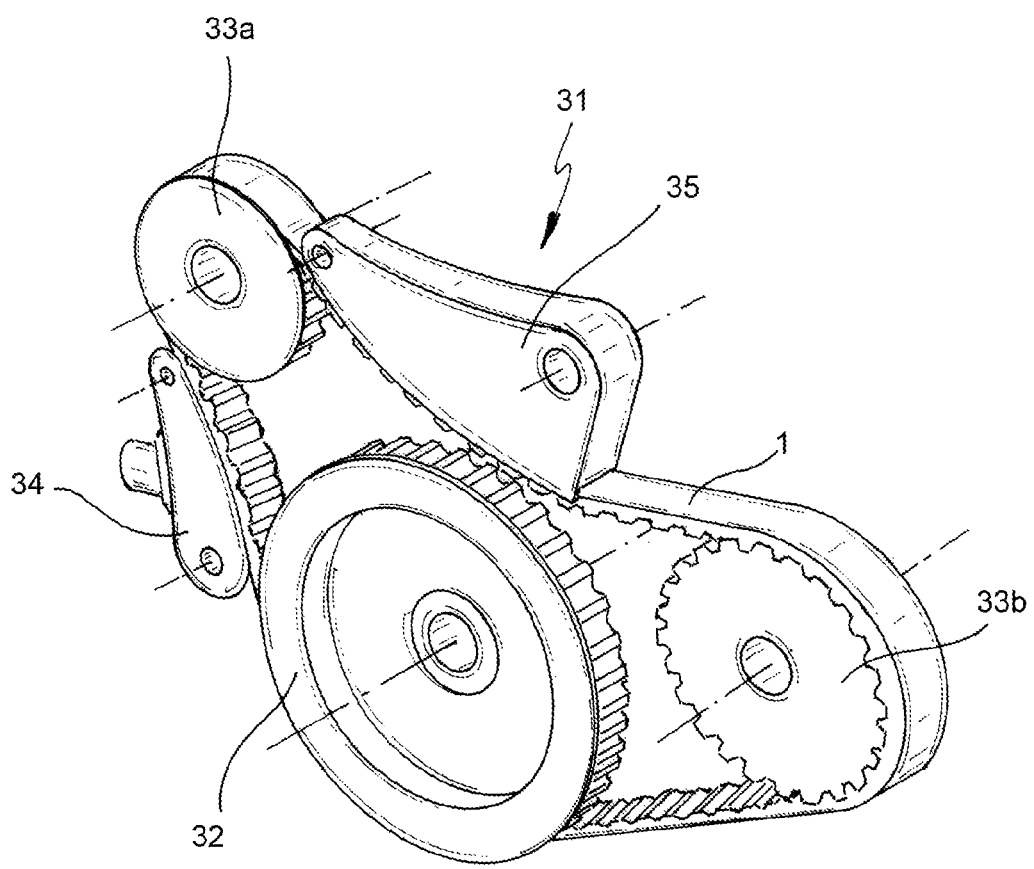
FIG. 6 is a diagram of a third timing control system using a third toothed belt according to the present invention.
Figure 7:
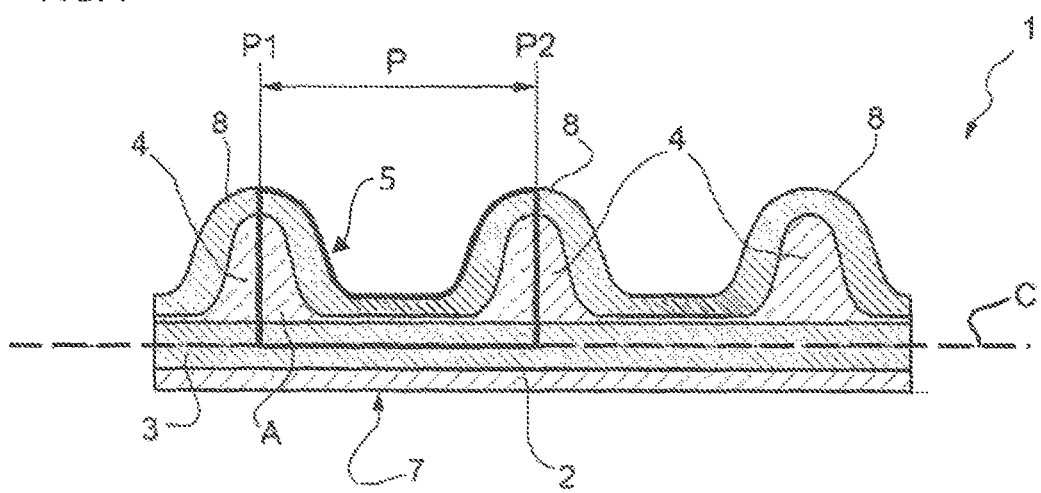
FIG. 7 is a side view of a portion of an embodiment of a toothed belt having a continuous covering.

According to a third embodiment of the present invention, shown in FIG. 6, a toothed belt 1 according to the present invention can advantageously be used in a timing control system indicated as a whole in the figure by reference numeral 31, which comprises a drive pulley 32 rigidly fastened to the driveshaft, not shown, a first 33a and a second 33b driven pulley, a shoe tensioner 34 and a shoe 35.

In particular, the transmission belt of the present invention has proved to be particularly effective when used in a transmission system commonly known as a balance shaft.

In use, the toothed belts 1 in the respective control systems 11 and 31 are in direct contact with oil.

FIGS. 4 to 6 refer to control systems related to the movement of balance countershafts, but it is clear that the belt according to the present invention can also be used in so-called cam-to-cam systems or for driving the oil pump. In these cases, the belt becomes partially immersed in an oil bath during operation.

Furthermore, it is also possible to use the belt of the present invention in the main transmission for driving cams and also for driving the injection pump in diesel engines.

Alternatively, the belt according to the present invention can also be used as a dry timing belt.

From an examination of the characteristics of the belt produced according to the present invention, the advantages that can be achieved with it are evident.

It has been experimentally verified that the use of the toothed belt according to the present invention enables having an extended service life as the covering 8 made of a plastic or metal material that extends over at least a portion of the working surface enables ensuring a significant improvement in the mechanical characteristics compared to toothed belts where fabrics are used as covering, as well as to toothed belts where films of thermoplastic material are used.

In this way, the toothed belts according to the invention enable assuring that the toothed belt does not need to be replaced for the entire working life of the vehicle.

It has also been verified that the toothed belts according to the present invention also allow achieving effective oil resistance even at high temperatures and consequently pass the durability tests to which toothed belts are subjected in order to be used in motor vehicles and therefore avoid all the belt problems when used continuously in contact with oil and, in particular, the fall-off in mechanical characteristics, less adhesion, worse meshing and less wear resistance.

Furthermore, it has also been verified that the belts of the present invention can be used as dry belts in high-operating-temperature timing systems, where high operating temperature is intended as a temperature greater than 130° C.

The invention claimed is:

1. A toothed transmission belt comprising:
   a body made of a first elastomeric material,
   a plurality of teeth,
   a plurality of cords buried in the body of the belt, and
   wherein said belt has a working surface being a surface of the belt that meshes with a corresponding pulley and said working surface is at least partially covered by a covering, and has a back surface opposite the working surface,
   wherein, in a side view, each of said plurality of teeth is oriented generally transverse to a neutral axis of said plurality of cords;
   wherein said covering occupies at least 25% of a unitary longitudinal section; and
   wherein said unitary longitudinal section is the area of a longitudinal cross-section that is parallel to the direction of the belt within a perimeter defined by uniting the plane that joins the neutral axis of said plurality of cords, the working surface, and the median transverse planes of two adjacent teeth;
   wherein said covering is a non-elastomeric material comprising at least one of a plastic material, thermoplastic material, a thermosetting material, and a metal material;
   wherein said covering partially covers the working surface as a plurality of caps, one each covering one of said plurality of teeth and part of the roots of said one of the plurality of teeth as a continuous layer of non-elastomeric material.

2. A transmission belt according to claim 1, wherein said covering occupies between 25% and 100% of said unitary longitudinal section.

3. A transmission belt according to claim 1, wherein said covering occupies between 25% and 85% of said unitary longitudinal section.

4. A transmission belt according to claim 1, wherein said covering occupies between 30% and 80% of said unitary longitudinal section.

5. A transmission belt according to claim 1, wherein said belt has a pitch in the range of 5 to 10 mm.

6. A transmission belt according to claim 1, characterized in that said covering has regions of greater thickness and regions of lesser thickness.

7. A transmission belt according to claim 1, characterized in that said covering has regions of greater thickness at the roots of the teeth.

8. A transmission belt according to claim 1, wherein said non-elastomeric material comprises at least one of a thermoplastic material, a thermosetting material and a metal material.

9. A transmission belt according to claim 1, wherein said covering comprises at least one material constituted by polyolefin macromolecules or macromolecules in which aromatic rings, carboxylic groups or halide ions are present in the monomers.

10. A transmission belt according to claim 9, wherein said material is loaded with fibres in a quantity of between 1% and 50% by weight of the total non-elastomeric material, the fibres being dispersed homogenously throughout the non-elastomeric material.

11. A transmission belt according to claim 1, wherein said covering comprises at least one material selected from the group consisting of polyethylene, polypropylene, PMI, PMMA, polyamide, PAI, PAN, PET, PBT, PPE, PPO, PPS, PI, PEI, PEK, PEEK, PTFE, PUR and PEN.

12. A transmission belt according to claim 1, wherein said covering comprises a metal material.

13. A transmission belt according to claim 1, wherein said covering partially surrounds said cords.

14. A transmission belt according to claim 1, wherein said cords are completely surrounded by said body.

15. A transmission belt according to claim 1, wherein said first elastomeric material comprises more than 50% by weight, calculated on the total weight of elastomer of the compound, of a polymer comprising acrylonitrile units.

16. A transmission system, wherein it comprises a transmission belt according to claim 1.

17. A transmission system comprising:
a transmission belt according to claim 1, that is continuously in contact with oil.

18. A transmission belt comprising:
a body made of a first elastomeric material,
a plurality of teeth, and
a plurality of cords buried in the body of the belt;
wherein said belt has a working surface being the surface of the belt that meshes with a corresponding pulley and said working surface being partially defined by a covering in non-elastomeric material, and has a back surface opposite the working surface;
wherein said covering occupies at least 25% of a unitary longitudinal section; and
wherein said unitary longitudinal section is the area of a longitudinal cross-section of the belt within a perimeter defined by uniting the plane that joins the neutral axis of said cords, the working surface, and the median transverse planes of two adjacent teeth;
wherein said covering is discontinuous.

19. A transmission belt comprising:
a body made of a first elastomeric material,
a plurality of teeth, and
a plurality of cords buried in the body of the belt;
wherein said belt has a working surface being the surface of the belt that meshes with a corresponding pulley and said working surface being partially defined by a covering in non-elastomeric material or entirely defined by a covering in non-elastomeric material, and has a back surface opposite the working surface;
wherein said covering occupies at least 25% of a unitary longitudinal section; and
wherein said unitary longitudinal section is the area of a longitudinal cross-section of the belt within a perimeter defined by uniting the plane that joins the neutral axis of said cords, the working surface, and the median transverse planes of two adjacent teeth;
wherein said covering comprises at least one material constituted by polyolefin macromolecules or macromolecules in which aromatic rings, carboxylic groups or halide ions are present in the monomers and loaded with fibres in a quantity of between 1% and 50% by weight of the total non-elastomeric material, the fibres being dispersed homogenously throughout the non-elastomeric material.

20. A transmission belt comprising:
a body made of a first elastomeric material,
a plurality of teeth, and
a plurality of cords buried in the body of the belt;
wherein said belt has a working surface being the surface of the belt that meshes with a corresponding pulley and said working surface being partially defined by a covering in non-elastomeric material or entirely defined by a covering in non-elastomeric material, and has a back surface opposite the working surface;
wherein said covering occupies at least 25% of a unitary longitudinal section; and
wherein said unitary longitudinal section is the area of a longitudinal cross-section of the belt within a perimeter defined by uniting the plane that joins the neutral axis of said cords, the working surface, and the median transverse planes of two adjacent teeth;
wherein said covering has regions of greater thickness and regions of lesser thickness, and the regions of greater thickness are at the roots of each tooth.

* * * * *